Figure 1:
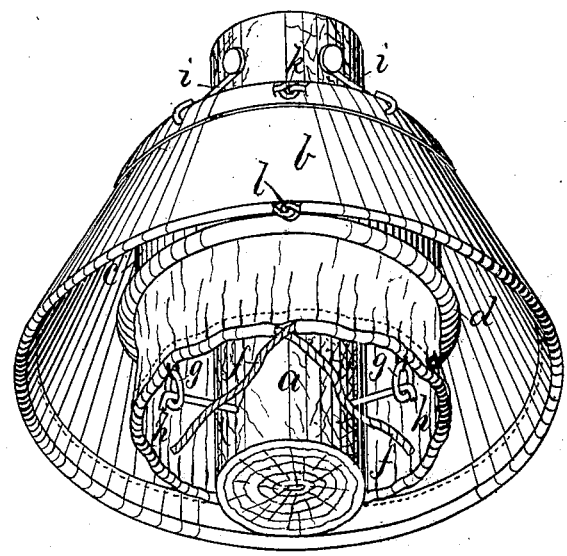

J. W. BOWDOIN.
Tree-Protector.

No. 205,721.  Patented July 9, 1878.

WITNESSES:
Henry Chadbourn.
F. Allen.

INVENTOR:
James W. Bowdoin
by Alban Andrén
his attorney.

UNITED STATES PATENT OFFICE.

JAMES W. BOWDOIN, OF BEVERLY, MASSACHUSETTS.

IMPROVEMENT IN TREE-PROTECTORS.

Specification forming part of Letters Patent No. 205,721, dated July 9, 1878; application filed September 3, 1877.

*To all whom it may concern:*

Be it known that I, JAMES W. BOWDOIN, of Beverly, in the county of Essex and State of Massachusetts, have invented certain new and useful Improvements in Tree-Protectors; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in tree-protectors, for the purpose of preventing the ravages on fruit-trees by canker-worms, &c.

My invention consists of the combination of a double bonnet composed of an outer conical protector or shield, and an inner or central part surrounding the trunk of the tree, and a suitable number of braces projecting from the upper rim of the said double bonnet to the trunk of the tree, where they are secured by nails or staples or suitable fastenings, so as to expand the said double bonnet in its upper end, and to retain it in its proper position when in use.

The central inner bonnet is provided with an annular pocket containing a roll of cord or other suitable material, which roll is located about midway between the top and bottom of said inner bonnet, and the latter is provided in its lower end with a gathering string or band, by which said lower end is drawn and tied tightly around the trunk of the tree when required for use, and in this manner the canker-worms are effectively prevented from ascending the tree any higher than up to the lower end of the gathered central bonnet. If so desired, a soft packing may be introduced between the gathered lower end of the central bonnet and the trunk of the tree, so as to insure a still closer connection, particularly if the trunk is of irregular shape.

The roll and pocket on the central bonnet serve two purposes, namely: First, to expand and retain said bonnet in its proper position; and, secondly, to prevent the cement or sticky substance that is put on the upper portion of said central bonnet from descending below said roll, by which that portion of the central bonnet that extends below said roll is always kept clean and pliable, so that it can be gathered and secured tightly around the trunk of the tree when required for use, and unfastened and freely expanded when not required for use, so as to leave an open circulation of air around all parts of the trunk. By this arrangement the protector, after once being put in its position on the tree, may remain so for years without injury to such tree, and all that is necessary to do when the protector is to be used is to gather the lower end of the central bonnet together and secure it tightly around the trunk of the tree. Suitable cement or sticky substance is also to be placed on the inner side of the tapering bonnet, which latter also serves as a shield or cover for the inner bonnet.

If so desired, the lower part of the central bonnet may be provided with suitable rings or loops, &c., placed upon stationary guides attached to the tree, so as to prevent the said inner bonnet rising upward when gathered or ungathered.

Figure 2:
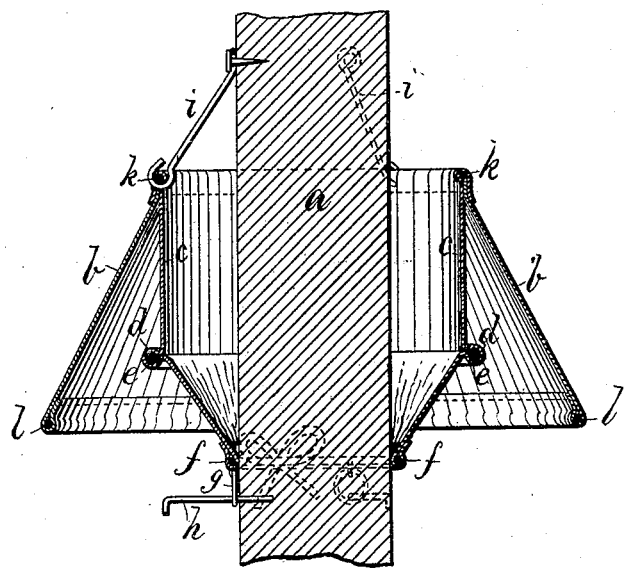

On the accompanying drawings, Figure 1 represents a perspective view of my improved tree-protector with its central bonnet ungathered, and Fig. 2 represents a central longitudinal section of the same with the lower end of its central bonnet gathered together around the tree in a proper working position.

Similar letters refer to similar parts wherever they occur on the different parts of the drawings.

*a* represents the trunk of a tree. *b* represents outer conical bonnet, attached all round in its upper end to the central inner bonnet *c*, the latter being large enough so as to allow a suitable space to be left between it and the trunk, as shown. *d* represents the annular pocket on the central bonnet *c*, having inserted within it a roll, *e*, of suitable material, as shown. *f* represents the gathering string or band in the lower end of the central bonnet, for the purpose described. *g g* represent rings or loops, &c., in the gather of the central bonnet *c*, and *h h* represent their stationary guides. *i i i* represent the braces extending from the upper end of the double bonnet *b c* to the trunk *a*, as shown in the drawings. The upper and lower ends of the bonnet *b* are provided with suitable expanders k and l in the usual manner.

Having thus fully described the nature, construction, and operation of my invention, I wish to secure by Letters Patent, and claim—

1. In combination with the outer tapering bonnet b, the inner flexible cylindrical bonnet c, provided midway with an annular flexible roll, e, and terminating in a gathering seam and string, f, the two bonnets being united at their upper ends, substantially as and for the purpose set forth.

2. In combination with the double bonnet b c, the gathering seam and string f, the rings or loops g g g, and stationary guides h h h, as and for the purpose set forth and shown.

In testimony that I claim the foregoing as my own invention I have affixed my signature in presence of two witnesses.

JAMES W. BOWDOIN.

Witnesses:
 ALBAN ANDRÉN,
 HENRY CHADBOURN.